United States Patent
Oka et al.

(10) Patent No.: US 12,428,016 B2
(45) Date of Patent: Sep. 30, 2025

(54) CONTROL DEVICE, CONTROL METHOD, AND STORAGE MEDIUM

(71) Applicant: HONDA MOTOR CO., LTD., Tokyo (JP)

(72) Inventors: Keisuke Oka, Saitama (JP); Shun Iwasaki, Tokyo (JP); Shota Ishikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 18/494,326

(22) Filed: Oct. 25, 2023

(65) Prior Publication Data

US 2024/0140470 A1    May 2, 2024

(30) Foreign Application Priority Data

Oct. 26, 2022   (JP) .................................. 2022-171192

(51) Int. Cl.
   *G08G 1/14* (2006.01)
   *B60W 30/06* (2006.01)
   (Continued)

(52) U.S. Cl.
   CPC ............ *B60W 50/14* (2013.01); *B60W 30/06* (2013.01); *G06V 20/586* (2022.01);
   (Continued)

(58) Field of Classification Search
   CPC ................. B60W 50/14; B60W 30/06; B60W 2050/146; B60W 2420/403;
   (Continued)

(56) References Cited

U.S. PATENT DOCUMENTS

2018/0265079 A1*  9/2018  Nakada ................ G05D 1/0223
2021/0323538 A1* 10/2021  Takahashi .............. G08G 1/143
(Continued)

FOREIGN PATENT DOCUMENTS

| JP | 2000-127851 A | 5/2000 |
|----|---------------|--------|
| JP | 2008-207732 A | 9/2008 |
| JP | 2022-016908 A | 1/2022 |

OTHER PUBLICATIONS

Aug. 5, 2025, Translation of Japanese Office Action issued for related JP Application No. 2022-171192.

*Primary Examiner* — Anh V La
(74) *Attorney, Agent, or Firm* — Paratus Law Group, PLLC

(57) ABSTRACT

A control device includes: an external environment recognition unit configured to acquire recognition data of an external environment; an automatic driving control unit configured to perform automatic driving control; a storage unit configured to store target position information; and a target position detection unit configured to detect a target position. When the target position is detected, the automatic driving control unit executes first determination processing of determining whether a self-position of the moving body with respect to the target position is estimated, executes, when the self-position is estimated, second determination processing of determining whether a target not included in the target position information is present around the target position, issues, when the target is present, a notification inquiring of a user of the moving body necessity of executing the automatic driving control, and executes, when the target is not present, the automatic driving control.

18 Claims, 10 Drawing Sheets

(51) Int. Cl.
  *B60W 50/14*       (2020.01)
  *G06V 20/58*       (2022.01)
(52) U.S. Cl.
  CPC . *B60W 2050/146* (2013.01); *B60W 2420/403* (2013.01); *B60W 2540/225* (2020.02); *B60W 2556/10* (2020.02)
(58) Field of Classification Search
  CPC ....... B60W 2540/225; B60W 2556/10; B60W 60/001; G06V 20/586
  USPC .......... 340/932.2, 933, 937, 988, 990, 995.1
  See application file for complete search history.

(56) References Cited

U.S. PATENT DOCUMENTS

| | | | |
|---|---|---|---|
| 2022/0012509 A1 | 1/2022 | Tagawa et al. | |
| 2022/0161785 A1* | 5/2022 | Tashiro | B60W 10/18 |
| 2023/0017805 A1* | 1/2023 | Kohara | B62D 15/0285 |
| 2023/0125351 A1* | 4/2023 | Hiei | G06T 7/73 |
| | | | 340/932.2 |

* cited by examiner

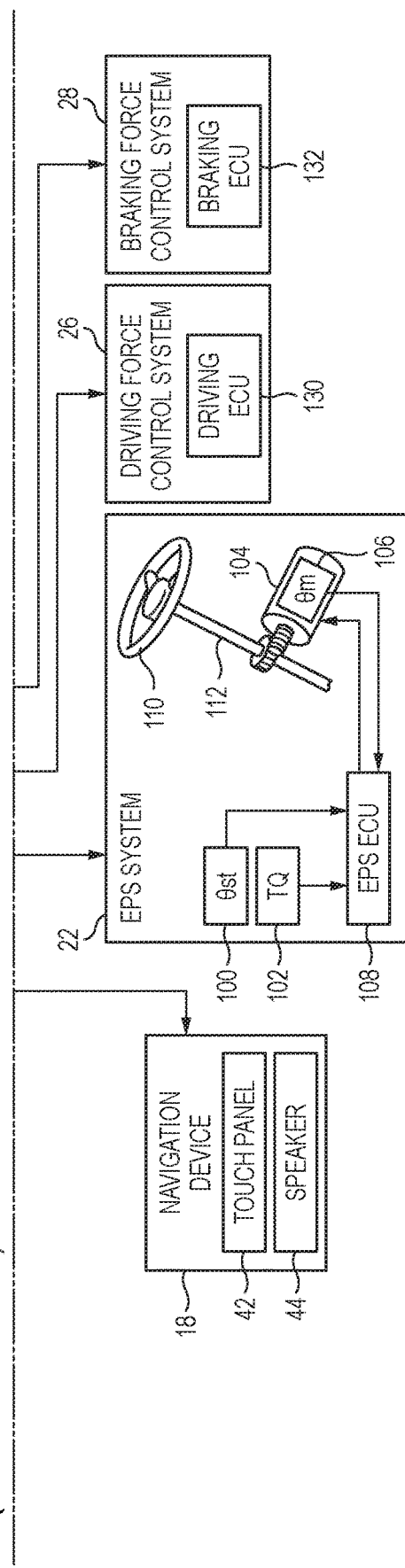

CONTROL DEVICE, CONTROL METHOD, AND STORAGE MEDIUM

CROSS-REFERENCE RELATED ARTS

This application is based on and claims priority under 35 USC 119 from Japanese Patent Application No. 2022-171192 filed on Oct. 26, 2022, the entire contents of which are incorporated herein by reference.

TECHNICAL FIELD

The present disclosure relates to a control device, a control method, and a storage medium storing a control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to automatic driving technique.

In the related art, automatic parking control in which a vehicle is automatically moved and parked in a predetermined parking space is known. JP2000-127851A discloses a vehicle driving assistance device in which a driving operation performed during parking in the past is stored in a storage unit in association with an image captured by a camera, and if it is determined that there is similarity between an image captured by the camera when parking is newly performed and an image stored in the storage unit, that is, if parking is performed in a similar state (the same place) in the past, control is performed such that the vehicle is parked according to the stored driving operation.

SUMMARY

However, in a case where it is determined whether a parking position is a parking position used in the past based on the similarity between the images captured by the camera, even if it is the parking position used in the past, when an object not captured in the image during parking in the past is imaged during new parking, it may be determined that there is no similarity. In this case, automatic parking cannot be executed regardless of the imaged object, which may cause a burden on the user. JP2000-127851A does not disclose control when an object different from that in an image during the parking in the past is imaged. Therefore, there is room for improvement in the related art in this regard.

An object of the present disclosure is to provide a control device, a control method, and a control program that can improve usability when performing automatic driving control of a vehicle to a target position.

According to an aspect of the present disclosure, there is provided a control device including:

an external environment recognition unit configured to acquire recognition data of an external environment of a moving body;
an automatic driving control unit configured to perform automatic driving control for moving the moving body to a target position;
a storage unit configured to store target position information on the target position; and
a target position detection unit configured to detect the target position based on the recognition data,
in which, in response to the target position being detected, the automatic driving control unit
executes first determination processing of determining whether a self-position of the moving body with respect to the target position is estimated based on comparison between the recognition data and the target position information,
executes, in a case where the self-position is estimated in the first determination processing, second determination processing of determining whether a target not included in the target position information is present around the target position,
issues, in a case where it is determined in the second determination processing that the target is present, a notification inquiring of a user of the moving body necessity of
executing the automatic driving control for the target position, and executes, in a case where it is determined in the second determination processing that the target is not present, the automatic driving control.

According to another aspect of the present disclosure, there is provided a control method performed by a control device including a processor, the control device being configured to acquire recognition data of an external environment of a moving body, perform automatic driving control for moving the moving body to a target position, store target position information on the target position, and detect the target position based on the recognition data, the control method including:

in response to the target position being detected,
executing, by the processor, first determination processing of determining whether a self-position of the moving body with respect to the target position is estimated based on comparison between the recognition data and the target position information,
executing, by the processor, in a case where the self-position is estimated in the first determination processing, second determination processing of determining whether a target not included in the target position information is present around the target position,
issuing, by the processor, in a case where it is determined in the second determination processing that the target is present, a notification inquiring of a user of the moving body necessity of executing the automatic driving control for the target position, and
executing, by the processor, in a case where it is determined in the second determination processing that the target is not present, the automatic driving control.

According to another aspect of the present disclosure, there is provided a non-transitory computer readable storage medium storing a control program of a control device configured to acquire recognition data of an external environment of a moving body, perform automatic driving control for moving the moving body to a target position, store target position information on the target position, and detect the target position based on the recognition data, the control program causing a processor of the control device to execute processing including:
in response to the target position being detected,
executing first determination processing of determining whether a self-position of the moving body with respect to the target position is estimated based on comparison between the recognition data and the target position information, executing, in a case where the self-position is estimated in the first determination processing, second determination processing of determining whether a target not included in the target position information is present around the target position, issuing, in a case where it is determined in the second determination processing that the target is present, a notification inquiring of a user of the moving body necessity of executing the automatic driving control for the target position, and executing, in a case where it is determined in the second determination processing that the target is not present, the automatic driving control.

According to the control device, the control method, and the storage medium storing the control program according to the present disclosure, it is possible to improve usability when performing automatic driving control of a vehicle to a target position. The present disclosure may contribute to development of a sustainable transportation system.

DESCRIPTION OF EMBODIMENTS

Figure 1:
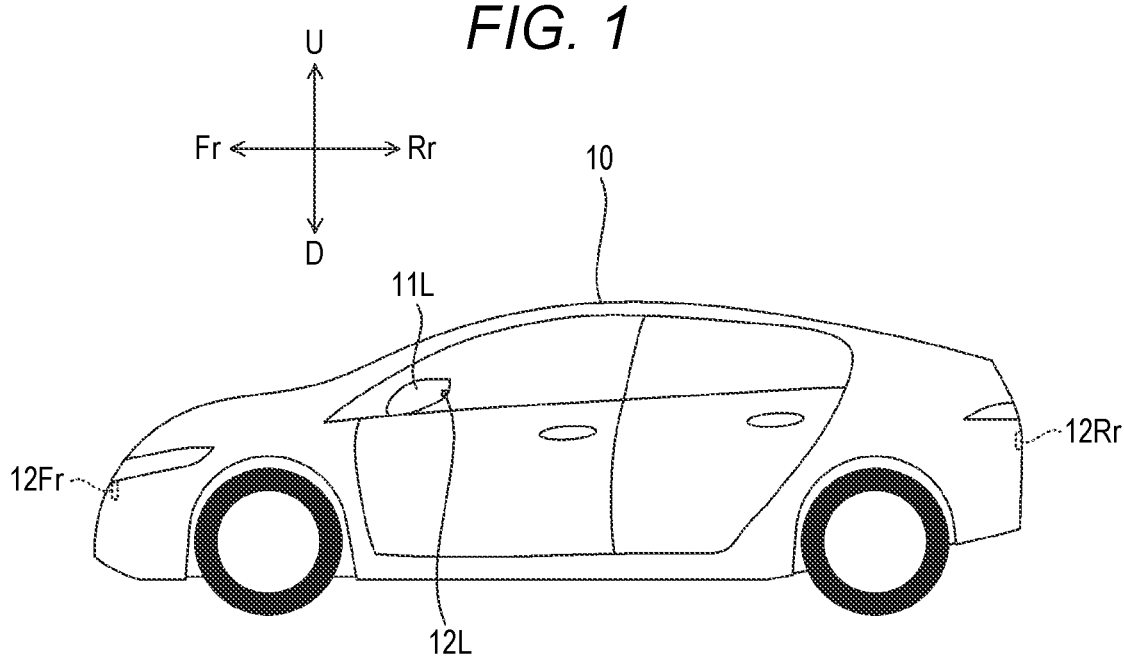
FIG. 1 is a side view showing an example of a vehicle on which a control device according to the present embodiment is mounted.

Hereinafter, an embodiment of a control device, a control method, and a control program of the present disclosure will be described with reference to the accompanying drawings. The drawings are viewed in directions of reference numerals. Further, in the present specification and the like, in order to simplify and clarify description, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

(Vehicle 10 on which Control Device of Present Invention is Mounted)

Figure 2:
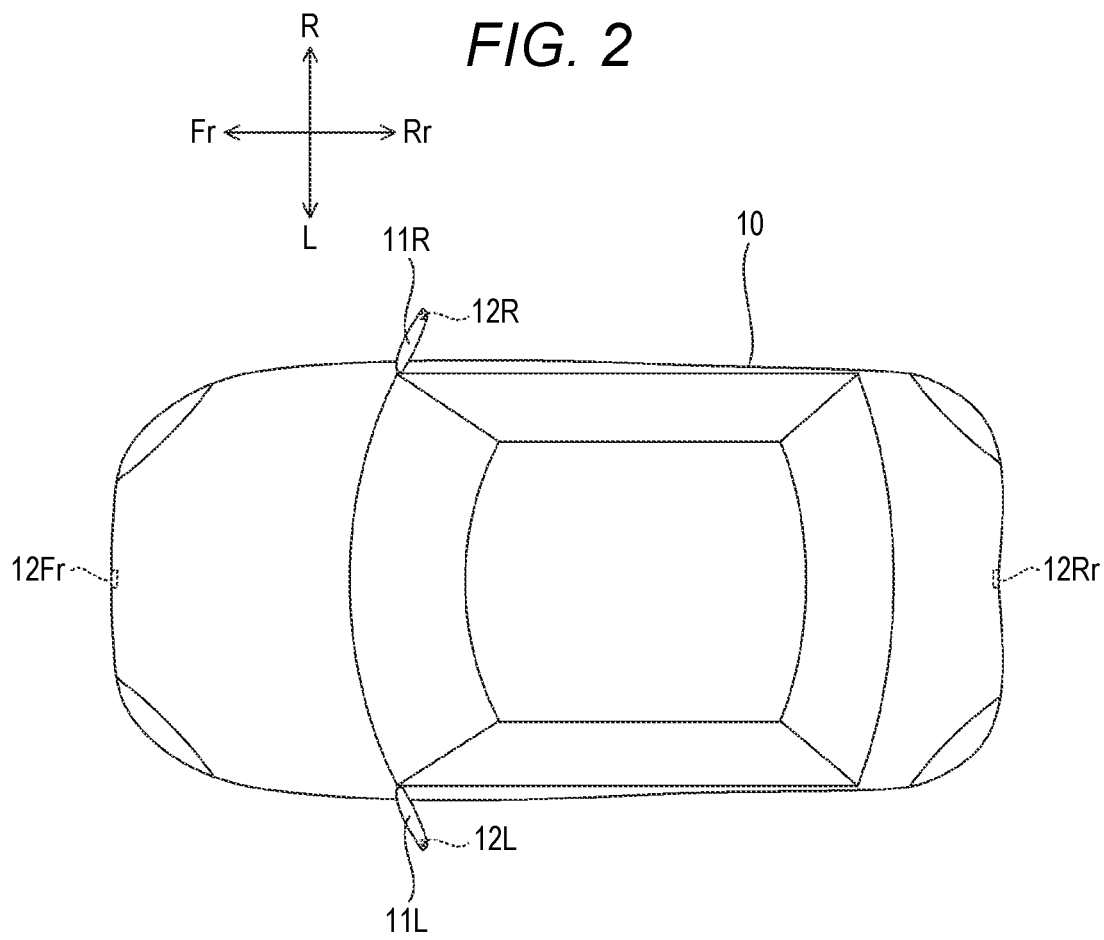
FIG. 2 is a top view of the vehicle shown in FIG. 1.

FIG. 1 is a side view of the vehicle 10 on which the control device of the present disclosure is mounted. FIG. 2 is a top view of the vehicle 10 shown in FIG. 1. The vehicle 10 is an example of a moving body of the present disclosure.

The vehicle 10 is an automobile including a drive source (not shown), and wheels including drive wheels driven by power of the drive source and steerable driven wheels. In the present embodiment, the vehicle 10 is a four-wheel automobile including a pair of left and right front wheels and rear wheels. The drive source of the vehicle 10 is, for example, an electric motor. The drive source of the vehicle 10 may be an internal combustion engine such as a gasoline engine or a diesel engine, or a combination of the electric motor and the internal combustion engine. Further, the drive source of the vehicle 10 may drive the pair of left and right front wheels, the pair of left and right rear wheels, or the four wheels including the pair of left and right front wheels and rear wheels. Both the front wheels and the rear wheels may be the steerable driven wheels, or either one of the front wheels and the rear wheels may be the steerable driven wheels.

The vehicle 10 further includes side mirrors 11L and 11R. The side mirrors 11L and 11R are mirrors (rear-view mirrors) that are provided on outer sides of front seat doors of the vehicle 10 for the driver to confirm a rear side and rear left and right sides. Each of the side mirrors 11L and 11R is fixed to a main body of the vehicle 10 by a rotation shaft that extends in a perpendicular direction, and may be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided on a front side of the vehicle 10 and that images the front side of the vehicle 10. The rear camera 12Rr is a digital camera that is provided on a rear side of the vehicle 10 and that images the rear side of the vehicle 10. The left side camera 12L is a digital camera that is provided on the left side mirror 11L of the vehicle 10 and that images a left side of the vehicle 10. The right side camera 12R is a digital camera that is provided on the right side mirror 11R of the vehicle 10 and that images a right side of the vehicle 10.

(Internal Configuration of Vehicle 10)

Figure 3:
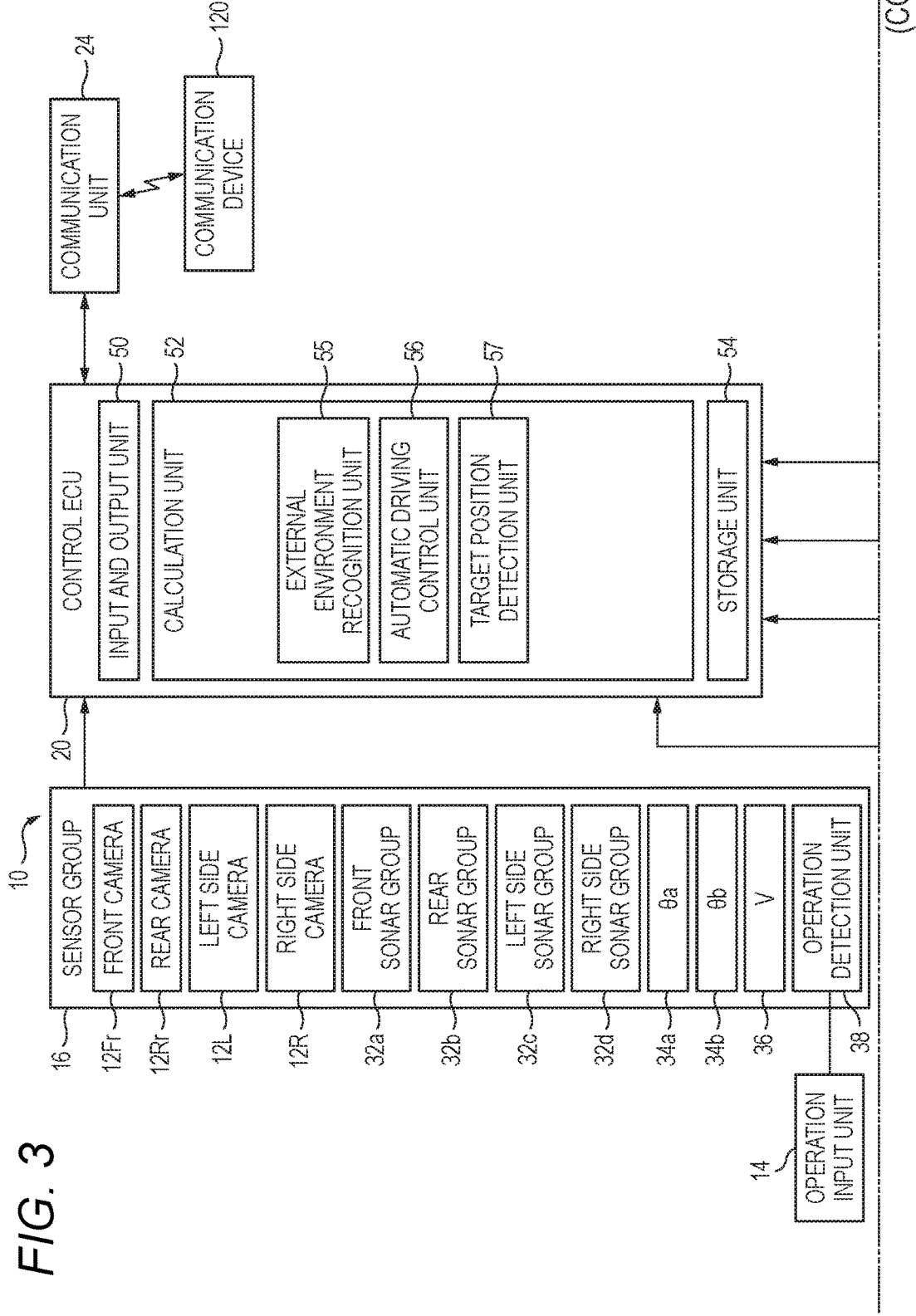
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38.

The front camera 12Fr, the rear camera 12Rr, the left side camera 12L, and the right side camera 12R acquire recognition data (for example, the surrounding image) for recognizing the external environment of the vehicle 10 by imaging surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image including the left side image and the right side image may be referred to as a side image.

The front sonar group 32*a*, the rear sonar group 32*b*, the left side sonar group 32*c*, and the right side sonar group 32*d* emit sound waves to the surroundings of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are respectively provided at a left side front portion and a left side rear portion of the vehicle 10. The right side sonar group 32*d* includes, for example, two sonars. The sonars that constitute the right side sonar group 32*d* are respectively provided at a right side front portion and a right side rear portion of the vehicle 10.

The wheel sensors 34*a* and 34*b* detect rotation angles of the wheels of the vehicle 10. The wheel sensors 34*a* and 34*b* may include angle sensors, or may include displacement sensors. The wheel sensors 34*a* and 34*b* output detection pulses each time the wheels are rotated at a predetermined angle. The detection pulses output from the wheel sensors 34*a* and 34*b* are used for calculating the rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content of a user performed using the operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various kinds of guidance information by a sound to the user (passenger) of the vehicle 10.

The touch panel 42 is configured to input various commands to the control ECU 20. For example, the user may input a command related to movement assistance of the vehicle 10 via the touch panel 42. The movement assistance includes parking assistance and parking-lot-leaving assistance of the vehicle 10. Further, the touch panel 42 is configured to display various screens related to control content of the control ECU 20. For example, a screen related to the movement assistance of the vehicle 10 is displayed on the touch panel 42. Specifically, a parking assistance button for requesting the parking assistance of the vehicle 10 and a parking-lot-leaving assistance button for requesting the parking-lot-leaving assistance are displayed on the touch panel 42. The parking assistance button includes an automatic parking button for requesting parking by the automatic steering of the control ECU 20, and a support parking button for requesting support while parking the vehicle by an operation of the driver. The parking-lot-leaving assistance button includes an automatic parking-lot-leaving button for requesting parking-lot-leaving by the automatic steering of the control ECU 20, and a support parking-lot-leaving button for requesting support during the parking-lot-leaving by the operation of the driver. A component other than the touch panel 42, for example, an information terminal such as a smartphone or a tablet terminal may be used as an input device or a display device. Further, a head-up display (HUD) may be used as a display device.

The control ECU 20 includes an input and output unit 50, a calculation unit 52, and a storage unit 54. The calculation unit 52 includes, for example, a central processing unit (CPU). The calculation unit 52 performs various kinds of control by controlling the units based on a program stored in the storage unit 54. Further, the calculation unit 52 inputs and outputs a signal from and to each unit connected to the control ECU 20 via the input and output unit 50. The control ECU 20 is an example of the control device of the present disclosure.

The calculation unit 52 includes an external environment recognition unit 55 that acquires recognition data of an external environment of the vehicle 10, an automatic driving control unit 56 that performs automatic driving control for moving the vehicle 10 to a target position, and a target position detection unit 57 that detects a target position based on the recognition data.

The external environment recognition unit 55 acquires surrounding images (the recognition data of the external environment) of the vehicle 10 captured by the front camera 12Fr, the rear camera 12Rr, the left side camera 12L, and the right side camera 12R from the cameras. The external environment recognition unit 55 may also acquire the recognition data of the external environment of the vehicle 10 acquired by the sonar groups 32*a* to 32*d* or a radar.

The automatic driving control unit 56 performs the movement assistance of the vehicle 10 by automatic steering of automatically performing an operation of the steering 110 under control of the automatic driving control unit 56. In assistance of the automatic steering, operations of an accelerator pedal (not shown), a brake pedal (not shown), and the operation input unit 14 are automatically performed. Further, the automatic driving control unit 56 performs support assistance when the driver manually moves the vehicle 10 by operating the accelerator pedal, the brake pedal, and the operation input unit 14.

For example, the automatic driving control unit 56 controls automatic driving of moving the vehicle 10 to a designated predetermined target position based on the recognition data of the external environment of the vehicle 10 acquired by the front camera 12Fr, the rear camera 12Rr, the left side camera 12L, and the right side camera 12R and the predetermined target position designated by the user. The predetermined target position includes a registered target position registered in the storage unit 54 by the user, and an unregistered target position where the vehicle 10 may be parked. The registered target position refers to a specific target position for the user, for example, a parking space where the vehicle 10 of the user is frequently parked. The registered target position includes, for example, a monthly parking lot, a parking lot at home, and a coin-operated parking space where a parking frequency is high. The registered target position is detected by comparing "target position information" related to a position where the vehicle 10 is parked. The target position information refers to "features" of the target position detected based on sensing data of the camera, the sonar, and the radar.

The target position detection unit 57 detects a target position based on the recognition data of the external environment of the vehicle 10 acquired by the front camera 12Fr, the rear camera 12Rr, the left side camera 12L, and the right side camera 12R. The target position detection unit 57 detects a target position by comparing features of recognition data of an external environment for a currently detected target position with features of recognition data of an external environment for a target position registered by the user in the past. For example, when determining that a matching rate between the current features of the recognition data of the external environment and the past features of the recognition data of the external environment is equal to or larger than a threshold, the target position detection unit 57 detects the currently detected target position as the registered target position registered by the user in the past. The detection of the target position is executed, for example, when the vehicle 10 approaches the target position (for example, when the vehicle 10 approaches within a radius of 100 m) based on position information such as the GPS. However, the target position may be often detected during movement of the vehicle 10.

The target position detection unit 57 registers the target position designated by the user in the storage unit 54. The target position detection unit 57 registers the features of the recognition data of the external environment of the vehicle 10 (target position information) in association with a target position to be registered. The features related to the target position includes features of the target position itself, features around the target position, and the like. Examples of the features of the target position itself include features in which a character such as "parking" is displayed within the target position. Examples of the features around the target position include characteristic buildings and obstacles present around the target position. The target position is registered in the storage unit 54 as a map including the features of the surrounding image of the vehicle 10.

Specifically, when the target position is detected by the target position detection unit 57, based on comparison between the current recognition data of the external environment of the vehicle 10 and the target position information registered in the storage unit 54, the automatic driving control unit 56 executes first determination processing of determining whether a self-position of the vehicle 10 with respect to the detected target position can be estimated. The self-position estimation refers to recognizing a current relative position of the vehicle 10 with respect to the detected target position by collating the features detected in the current recognition data of the external environment with the target position information (features) on the registered target position.

When the self-position is estimated in the first determination processing, the automatic driving control unit 56 executes second determination processing of determining whether a target not included in the target position information is present around the detected target position. A place around the target position includes a region inside the target position and a region of surroundings outside the target position. The target is a target subjected to sensing performed by the camera, the sonar, or the radar. The target is basically an object (for example, a person, an object, a bicycle, or an animal), but may also be a hole (for example, a crack in ground).

When determining that the target is present in the second determination processing, the automatic driving control unit 56 issues a notification inquiring of the user of the vehicle 10 necessity of executing the automatic driving control to the target position, and executes the automatic driving control in response to an answer from the user. When determining that the target is not present in the second determination processing, the automatic driving control unit 56 executes the automatic driving control without inquiring necessity of executing the automatic driving control.

When the self-position cannot be estimated in the first determination processing, the automatic driving control unit 56 does not execute the automatic driving control. When the self-position cannot be estimated in the first determination processing, the automatic driving control unit 56 receives selection of a target position of the automatic driving control from the user of the vehicle 10. Even when the self-position cannot be estimated, the automatic driving control unit 56 does not immediately suspend the automatic driving control, and receives, from the user, designation of a target position desired by the user to move the vehicle 10 thereto.

The automatic driving control unit 56 determines whether a target is present based on comparison between a line of sight detection result of the user (a current line of sight) and history information on the line of sight of the user (a past line of sight) in the second determination processing. For example, if the current line of sight of the user deviates significantly from a representative value of history of the line of sight of the user when the vehicle automatically parked at the same target position in the past, it is determined that "there is a target". The history of the line of sight of the user includes a direction, a place, and the like that the user frequently views during the automatic parking (a habit of the user). The representative value of the history may be, for example, an average value of a plurality of times of history. In the second determination processing, the automatic driving control unit 56 extracts history information on a line of sight of a relative position the same as a current relative position of the vehicle 10 with respect to a target position this time of the vehicle 10 from the history information on the line of sight of the user, and determines whether the target is present based on comparison between the line of sight detection result of the user and the extracted history information on the line of sight.

When the self-position is estimated in the first determination processing, and when history information on the automatic driving control for the target position satisfies a predetermined condition, the automatic driving control unit 56 issues a notification inquiring of the user of the vehicle 10 necessity of executing the automatic driving control even when no target is present. The predetermined condition is that the user has little experience of the automatic driving control for the target position, that is, the number of times of use or a frequency of use of the automatic driving control for the target position is small.

The "parking" is a stop as an occupant gets on or off the vehicle, for example, and excludes a temporary stop due to a traffic signal or the like. Further, the "target position" is a parking position where the moving body is parked. The "parking position" refers to a position where the moving body is stopped.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 may perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

(Automatic Parking Performed by Control Device (Control ECU 20))

Next, automatic parking of the vehicle 10 performed by the control ECU 20 will be described with reference to FIGS. 4 to 10.

(Display Image During Automatic Parking)

Figure 4:
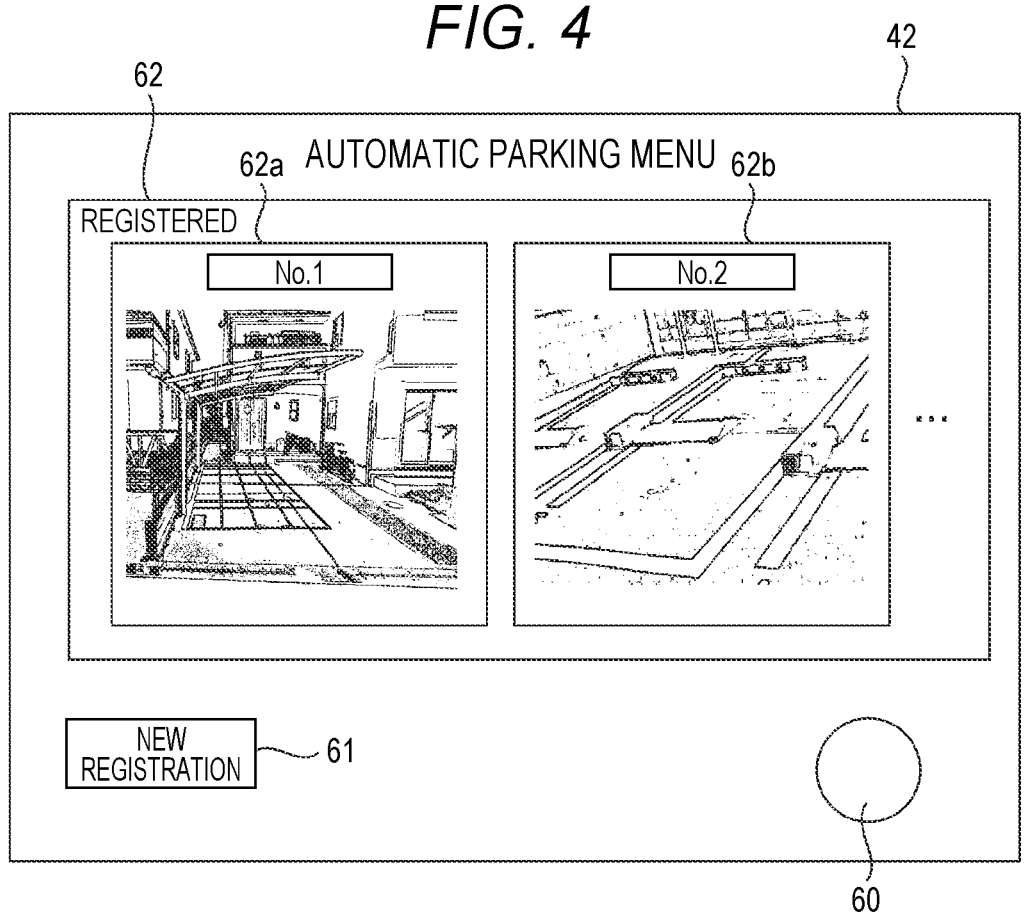
FIG. 4 is a diagram showing an example of an image displayed on a navigation device when automatically parking the vehicle.

FIG. 4 is a diagram showing an example of an "automatic parking menu" displayed on the touch panel 42 of the navigation device 18 when automatically parking the vehicle 10. An image of the automatic parking menu is displayed by touching an automatic parking button 60 displayed on the touch panel 42. For example, when a user who wants to park the vehicle 10 comes close to the parking lot, the automatic parking button 60 is touched to display the automatic parking menu.

As shown in FIG. 4, a new registration button 61 and a registered target position image button 62 are displayed in the image of the automatic parking menu. The new registration button 61 is a button operated when parking the vehicle 10 at a parking position that is to be newly registered as the target position. The registered target position image button 62 is a button operated when parking the vehicle 10 at a registered target position that is already registered. Examples of the registered target position image button 62 include a registered target position image button in which a parking lot at home is registered as the target position as shown in the No. 1 image button 62a, and a registered target position image button in which a coin-operated parking space having a high parking frequency is registered as the target position as shown in the No. 2 image button 62b. The image displayed in the registered target position image button 62 is an image captured by, for example, the front camera 12Fr of the vehicle 10 during the registration.

(Registration of New Target Position)

First, registration of the target position when the new registration button 61 is touched will be described with reference to FIGS. 5 to 8.

Figure 5:
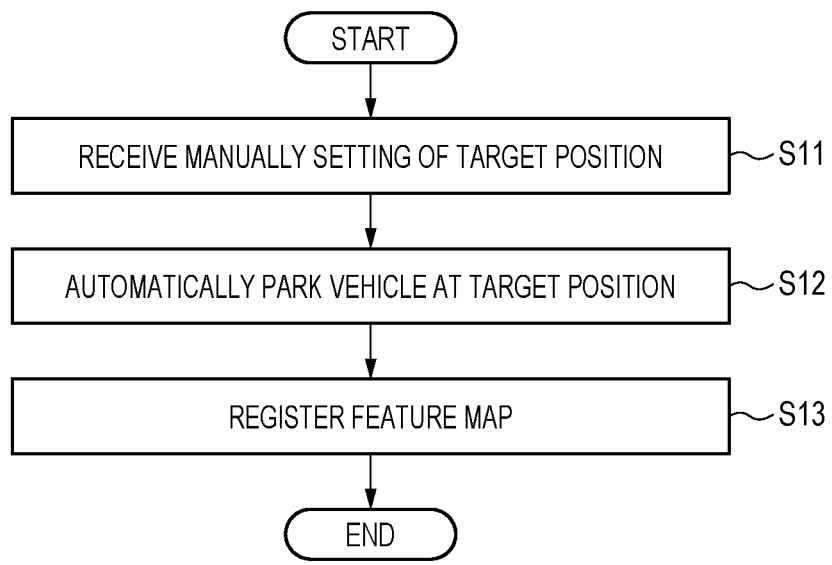
FIG. 5 is a flowchart showing processing of automatic parking for parking the vehicle at a new target position.
Figure 6:
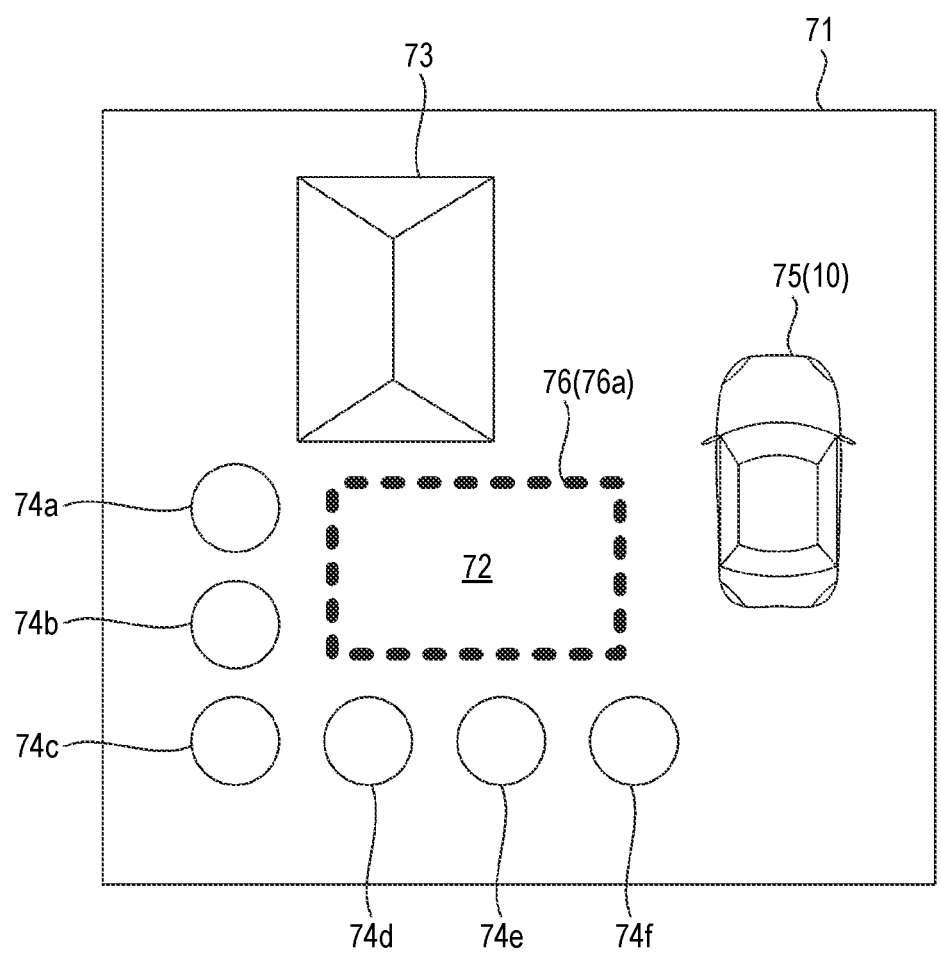
FIG. 6 is a diagram obtained by setting a target position in a top view image generated based on a captured image of a camera.
Figure 7:
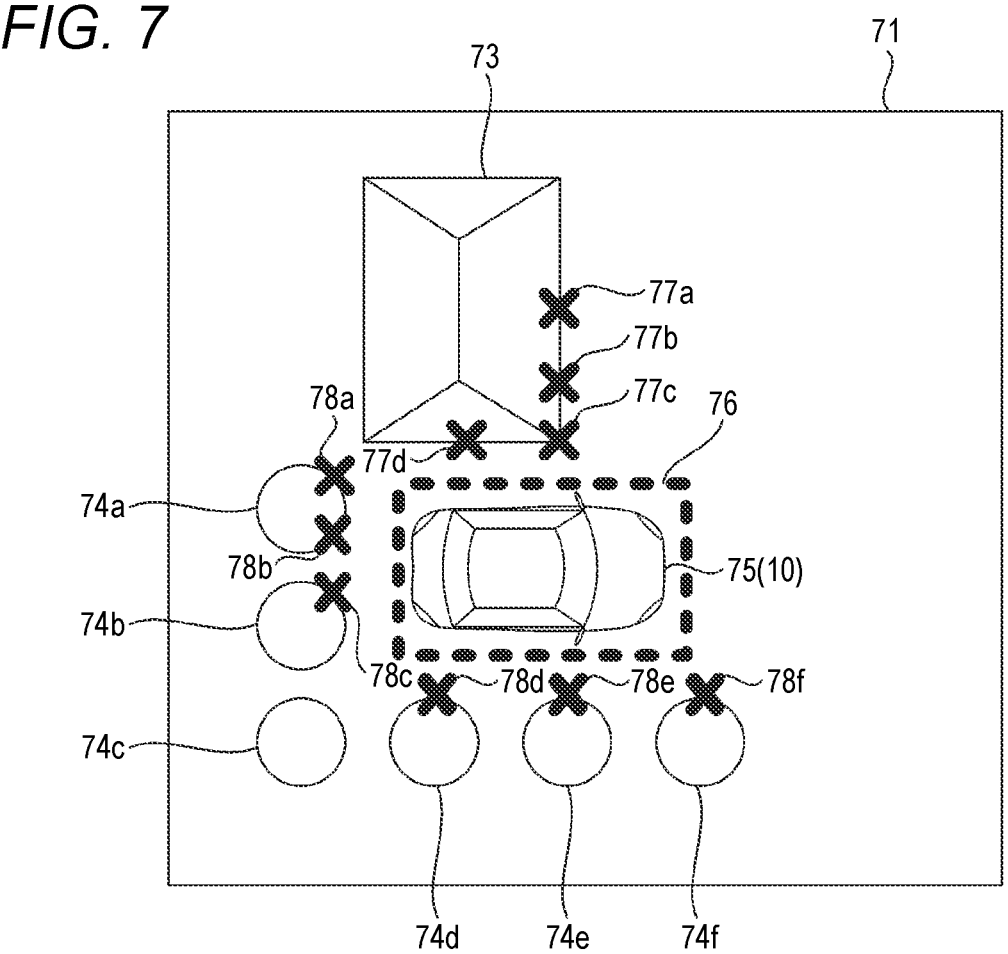
FIG. 7 is a diagram showing features around the target position shown in FIG. 6.
Figure 8:
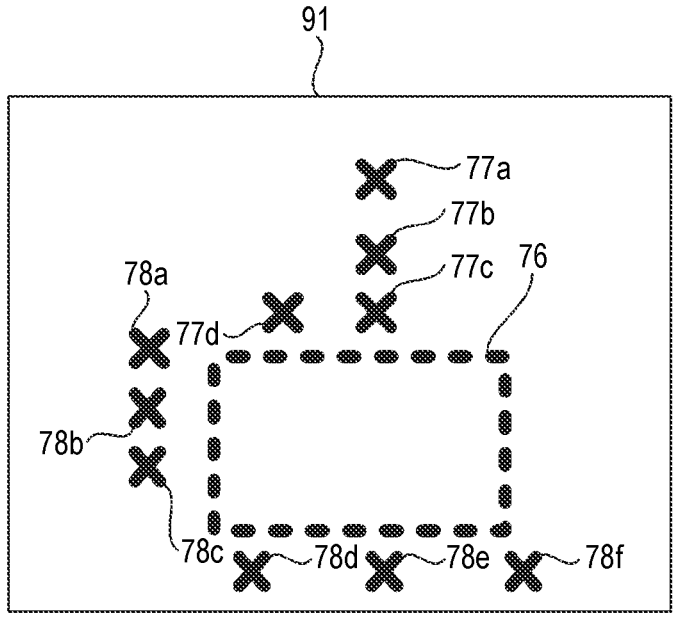
FIG. 8 is a diagram showing an example of a map of the target position registered in storage unit.

FIG. 5 is a flowchart showing processing of the automatic parking for parking the vehicle 10 at a new target position. FIG. 6 is a diagram obtained by setting a target position 76 in a top view image 71 (combined image) generated by the recognition data of the external environment of the vehicle 10 acquired by the front camera 12Fr, the rear camera 12Rr, the left side camera 12L, and the right side camera 12R. FIG. 7 is a diagram showing features around the target position 76 shown in FIG. 6. FIG. 8 is a diagram showing an example of a map of the target position 76 registered in the storage unit 54. When the new registration button 61 is touched, the automatic driving control unit 56 starts the processing shown in FIG. 5.

The automatic driving control unit 56 receives manual setting performed by the user for setting a target position of the vehicle 10 (step S11).

As shown in FIG. 6, a house (building) 73 of the user and a plurality of plantings (obstacles) 74a to 74f are captured in the top view image 71. The parking lot 72 is provided among the building 73 and the obstacles 74a to 74f The vehicle 10 of the user is stopped in front of the parking lot 72. The vehicle displayed in the top view image 71 is an image showing a state where the vehicle 10 is viewed from above, and is a vehicle image 75 generated (captured) in advance and stored in the storage unit 54 or the like. The target position may be manually set by touching the touch panel 42. Specifically, a rectangular broken-line frame 76a displayed on the top view image 71 is touched and moved so as to surround the parking lot 72 as shown in FIG. 6. Accordingly, the broken-line frame 76a moved so as to surround the parking lot 72 is set as the target position 76.

When receiving the manual setting of the target position 76 in step S11, the automatic driving control unit 56 detects features related to the designated target position 76 from the recognition data of the external environment acquired by the front camera 12Fr, the rear camera 12Rr, the left side camera 12L, and the right side camera 12R. The automatic driving control unit 56 automatically parks the vehicle 10 at the target position 76 based on the detected features and the recognition data of the external environment acquired by the front camera 12Fr, the rear camera 12Rr, the left side camera 12L, and the right side camera 12R (step S12).

As in the top view image 71 shown in FIG. 7, the automatic driving control unit 56 detects building features 77a to 77d showing a position of a contour of the building 73 on a side close to the target position 76, obstacle features 78a to 78f showing positions of the obstacles 74a to 74f present around the target position 76, and the like as the features related to the designated target position 76. FIG. 7 shows a state where the vehicle 10 is parked at the designated target position 76.

Next, the automatic driving control unit 56 registers a feature map including the target position 76 manually set in step S11 and the features related to the target position 76 detected in step S12 in the storage unit 54 (step S13).

The feature map including the target position 76 and the features thereof is registered as a feature map 91 as shown in FIG. 8. The feature map 91 is registered as a map indicating a relationship between the manually set target position 76 and the building features 77a to 77d and the obstacle features 78a to 78f that are detected as shown in FIG. 7.

Accordingly, the target position 76 designated by the user is registered in the storage unit 54 in association with the features showing the obstacles and the like present around the target position 76, and is displayed in the automatic parking menu (see FIG. 4) as one of the registered target position image buttons 62.

(Automatic Parking to Registered Target Position)

Figure 9:
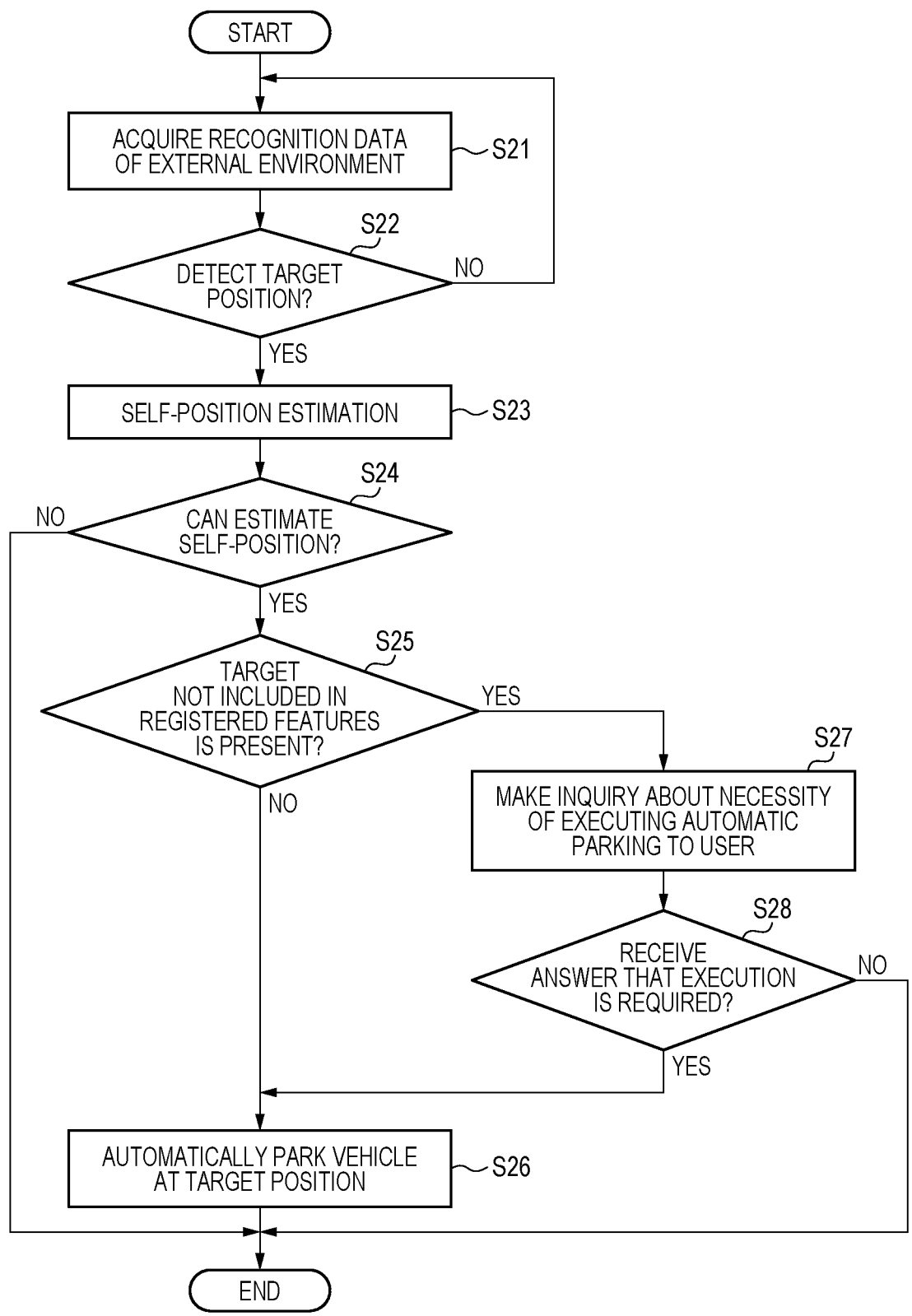
FIG. 9 is a flowchart showing processing for automatically parking the vehicle at a registered target position.
Figure 10:
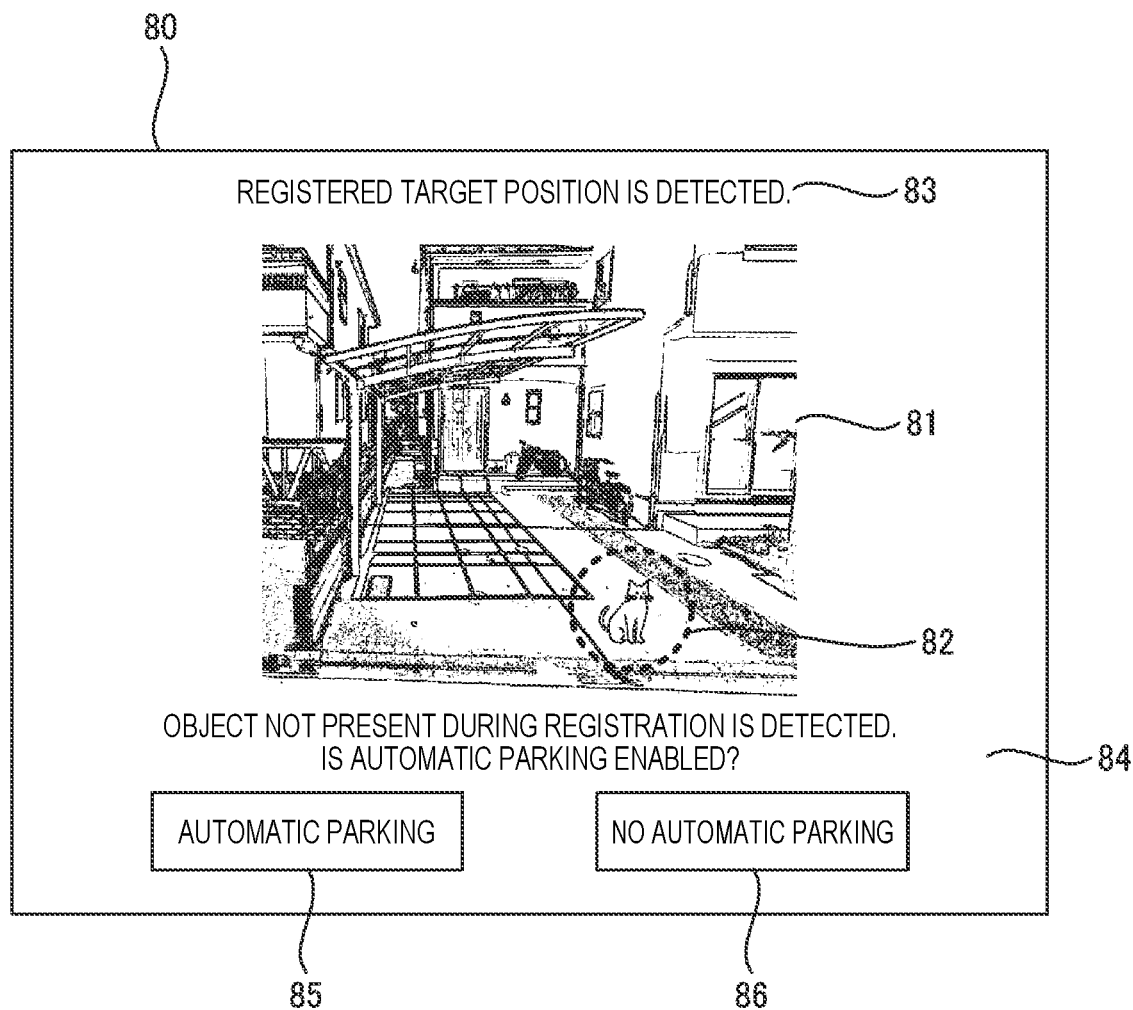
FIG. 10 is a diagram showing an example of an inquiry screen when a target not present during registration is detected.

Next, automatic parking of the vehicle 10 to the registered target position will be described with reference to FIGS. 9 and 10. FIG. 9 is a flowchart showing an example of processing for automatically parking the vehicle 10 at the registered target position. FIG. 10 is a diagram showing an example of an inquiry screen when a target not present during registration of the target position is detected. The control ECU 20 recognizes a position of the vehicle 10 by, for example, the GPS or the like, and starts the processing shown in FIG. 9 when determining that the vehicle 10 reaches a vicinity of the target position. The following description assumes that the target position where the vehicle 10 is parked is a parking lot at home shown in the No. 1 image button 62a of the automatic parking menu in FIG. 4.

First, the external environment recognition unit 55 acquires the recognition data of the external environment of the vehicle 10 captured by the front camera 12Fr, the rear camera 12Rr, the left side camera 12L, and the right side camera 12R (step S21).

Next, the target position detection unit 57 determines whether the target position is detected, that is, whether the parking lot at home of the registered target position is detected (step S22). As described above, the target position is detected by comparing the features of the recognition data of the external environment for the currently detected target position with the features of the recognition data of the external environment for the registered target position.

When the target position cannot be detected in step S22 (step S22: No), the target position detection unit 57 returns to step S21 and repeats the processing.

When the target position is detected in step S22 (step S22: Yes), the automatic driving control unit 56 performs the self-position estimation of the vehicle 10 with respect to the target position (step S23). As described above, the self-position estimation is performed by collating the features detected in the current recognition data of the external environment and the features of the registered target position to recognize the current relative position of the vehicle 10 with respect to the currently detected target position.

Next, the automatic driving control unit 56 determines whether the self-position may be estimated in the self-position estimation in step S23 (step S24).

When the self-position cannot be estimated in step S24 (step S24: No), the automatic driving control unit 56 ends the present automatic parking. In a case where the self-position cannot be estimated, for example, after notifying the user that the self-position with respect to the target position cannot be estimated, the automatic driving control unit 56 may execute registration of the new target position described in FIG. 5 when the user desires to do so.

When the self-position can be estimated in step S24 (step S24: Yes), the automatic driving control unit 56 determines whether a target not included in the features of the registered target position is present around the target position in the current recognition data of the external environment acquired in step S21 (step S25).

When the target not included in the features of the registered target position is not present in step S25 (step S25: No), the automatic driving control unit 56 automatically parks the vehicle 10 at the currently detected target position (step S26). The processing of the automatic parking is processing similar to that of step S12 in FIG. 5 described above.

When the target not included in the features of the registered target position is present in step S25 (step S25: Yes), the automatic driving control unit 56 inquires of the user necessity of executing the automatic parking (step S27).

For example, as shown in FIG. 10, it is assumed that a target 82 not registered as a feature of the registered target position is detected around the parking lot at home that is the registered target position. In this case, the automatic driving control unit 56 displays an inquiry screen 80 as shown in FIG. 10 on the touch panel 42. On the inquiry screen 80, an image 81 of the current target position where the detected target 82 is imaged (parking lot at home) is displayed, and a notification message 83 "registered target position is detected" and an inquiry message 84 "object not present during registration is detected. Is automatic parking enabled?" are displayed. Further, on the inquiry screen 80, an "automatic parking" button 85 for automatically parking the vehicle 10, and a "no automatic parking" button 86 for not executing the automatic parking are displayed. It may be recognized that the detected but not registered target 82 is, for example, a "cat", and the inquiry message 84 such as "cat is detected. Is automatic parking enabled?" may be displayed. Further, the inquiry screen 80 may be displayed on the HUD or the smartphone. The message may be output by a sound from the speaker 44 or the smartphone.

Next, the automatic driving control unit 56 determines whether an answer that execution is required (a touch operation of the "automatic parking" button 85) is received from the user for the inquiry in step S27 (step S28).

When the answer that the execution is required is received in step S28 (step S28: Yes), the automatic driving control unit 56 proceeds to step S26, and automatically parks the vehicle 10 at the currently detected target position. When the answer that the execution is required is not received in step S28 (step S28: No), the automatic driving control unit 56 ends the present automatic parking.

As described above, the automatic driving control unit 56 of the control device determines whether the self-position of the vehicle 10 with respect to the target position is estimated based on the comparison between the recognition data of the external environment of the vehicle 10 and the target position information that is the features of the target position when the target position is detected, determines whether the target 82 not included in the target position information is present around the target position when the self-position can be estimated, issues the notification inquiring of the user of the vehicle 10 the necessity of executing the automatic parking control to the target position when it is determined that the target 82 is present, and executes the automatic parking control when it is determined that the target is not present.

According to the configuration, even when the self-position of the vehicle 10 with respect to the target position is estimated, when the target not included in the target position information is present around the target position, the inquiry about the necessity of executing the automatic parking control is made to the user. Therefore, safety of the automatic parking control may be maintained. Further, even when the target not included in the target position information is present in the recognition data of the external environment, when the execution instruction of the automatic parking control is received from the user for the inquiry, it is possible to execute the automatic parking control. Therefore, for example, unlike a case where the automatic parking is executed only by similarity of images, it is possible to prevent a situation where the automatic driving control at the registered target position whose features are stored cannot be executed. Accordingly, opportunities capable of executing the automatic driving control at the registered target position may be increased, and usability may be improved. Further, when the target not included in the target position information is not present in the recognition data of the external environment, since the automatic driving control may be executed seamlessly without making an inquiry of the user, a burden on the user may be reduced, and the usability may be improved.

(Modification of Automatic Parking to Registered Target Position)

Next, a modification of the automatic parking of the vehicle 10 to the registered target position will be described with reference to FIGS. 11 and 12.

(First Modification)

Figure 11:
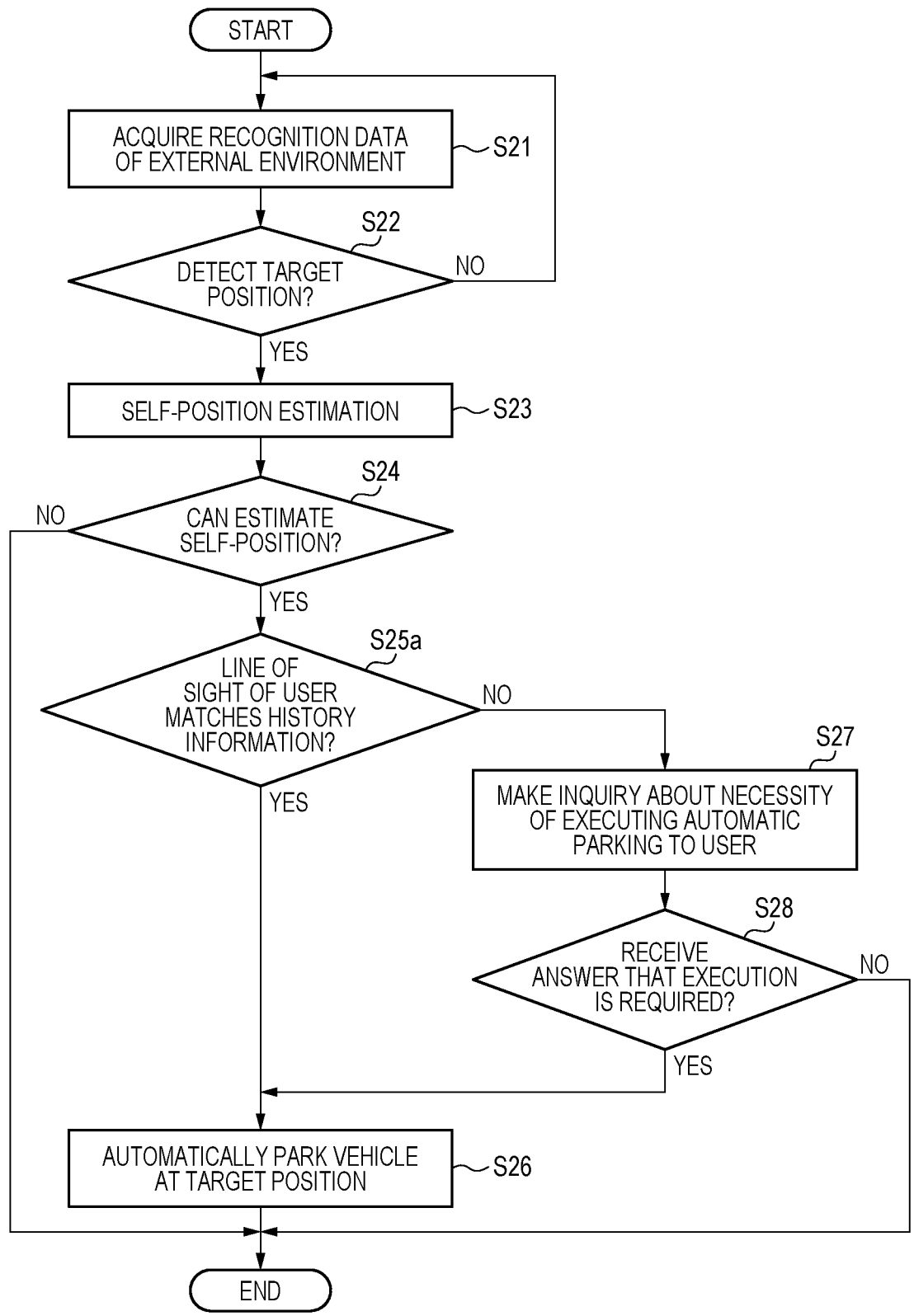
FIG. 11 is a flowchart showing a first modification of the processing of automatically parking the vehicle at the registered target position.

FIG. 11 is a flowchart showing a first modification of the processing of automatically parking the vehicle 10 at the registered target position. Also in a case of the first modification, as in FIG. 9, it is assumed that the vehicle 10 is parked at the parking lot at home shown in the No. 1 image button 62*a*.

As shown in FIG. 11, processing from step S21 to step S24 in the first modification is processing similar to the processing from step S21 to step S24 of the automatic parking described in FIG. 9. Therefore, description of steps S21 to S24 will be omitted.

When the self-position is estimated in step S24 (step S24: Yes), the automatic driving control unit 56 detects a current line of sight of the user during automatic parking this time, and determines whether the detected line of sight of the user matches a line of sight of the user during automatic parking in the past (history information on the line of sight) (step S25*a*).

For example, at a stage before the vehicle 10 is stopped and the automatic parking is started, it is detected where the user views, and it is determined whether a direction or a position viewed matches a direction or a position viewed during the automatic parking in the past. In this case, the automatic driving control unit 56 extracts history information on a relative position the same as a current relative position of the vehicle 10 with respect to a target position of the vehicle 10 for this time from history information on the line of sight of the user to determine whether the lines of sight of the user match each other. For example, when the vehicle 10 is back-parked at a target position on a left rear side, history information on a relative position the same as a positional relationship thereof is extracted from the storage unit 54 to determine whether the lines of sight match each other.

When the line of sight of the user matches the history information in step S25*a* (step S25*a*: Yes), the automatic driving control unit 56 determines that there is no target having features different from recognized registered features around the parking lot at home that is the registered target position, and automatically parks the vehicle 10 at a currently detected target position (step S26). The processing of the automatic parking is processing similar to that of step S12 in FIG. 5 described above.

When the line of sight of the user does not match the history information in step S25*a* (step S25*a*: No), the automatic driving control unit 56 determines that the target having the features different from the recognized registered features is present around the parking lot at home that is the registered target position, and makes an inquiry about necessity of executing the automatic parking to the user (step S27).

The inquiry method in step S27 (see FIG. 10) and the processing in step S28 are processing similar to the processing in steps S27 and S28 described in FIG. 9. Therefore, description of steps S27 and S28 will be omitted.

As described above, according to the first modification of the automatic parking control, the automatic driving control unit 56 determines whether the target is present based on the comparison between a line of sight detection result obtained by detecting the current line of sight of the user during the automatic parking this time and the history information on the line of sight of the user in the automatic parking performed in the past. Therefore, for example, in a case where a current line of sight significantly deviates from the representative value of the history of the line of sight of the user (for example, the average value of the line-of-sight history) in the automatic parking of the vehicle at the same target position in the past, it may be determined that "there is a target". Accordingly, it is possible to accurately detect the target not present during the automatic parking in the past according to characteristics (habits or the like) of the user when the vehicle 10 is automatically parked at the registered target position.

The automatic driving control unit 56 extracts the history information corresponding to the target position and the relative position of the vehicle 10 from the history information on the line of sight, and determines whether a target is present based on the comparison between the extracted history information and the current detection result of the line of sight of the user. Therefore, the presence or absence of the target can be determined by narrowing down the history of the line of sight of the user in the automatic parking at the same target position in the past to the history in which the relative position between the target position and the vehicle 10 is close to the current relative position. Accordingly, it is possible to further accurately determine the presence or absence of the target.

(Second Modification)

Figure 12:
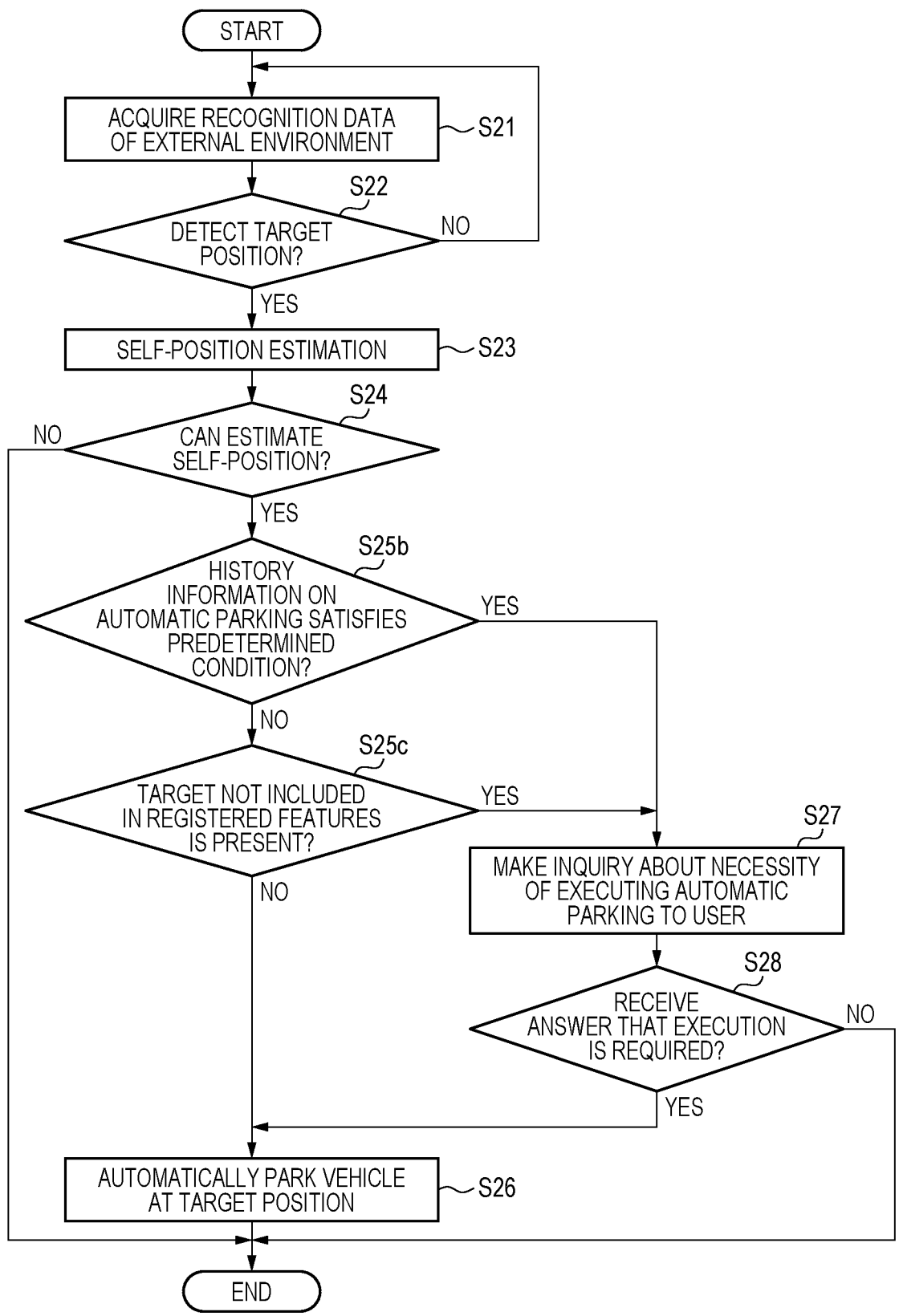
FIG. 12 is a flowchart showing a second modification of the processing of automatically parking the vehicle at the registered target position.

FIG. 12 is a flowchart showing a second modification of the processing of automatically parking the vehicle 10 at the registered target position. Also, in a case of the second modification, as in FIG. 9, it is assumed that the vehicle 10 is parked at the parking lot at home shown in the No. 1 image button 62*a*.

As shown in FIG. 12, processing from step S21 to step S24 in the second modification is processing similar to the processing from step S21 to step S24 of the automatic parking described in FIG. 9. Therefore, description of steps S21 to S24 will be omitted.

When the self-position can be estimated in step S24 (step S24: Yes), the automatic driving control unit 56 determines whether history information on the automatic parking satisfies a predetermined condition (step S25*b*). The history information satisfying the predetermined condition means that the number of times of use or a frequency of use of the user who causes the vehicle 10 to be automatically parked at the target position is small.

When the history information does not satisfy the predetermined condition in step S25*b* (step S25*b*: No), the automatic driving control unit 56 determines whether the target not included in the features of the registered target position is present around the target position in the current recognition data of the external environment acquired in step S21 (step S25c). Instead of the processing in step S25c, the processing in step S25a of the first modification (FIG. 11) described above may be executed.

When the history information satisfies the predetermined condition in step S25b (step S25b: Yes), the automatic driving control unit 56 makes an inquiry about necessity of executing the automatic parking to the user (step S27). That is, when the number of times of use or the frequency of use of the user who causes the vehicle 10 to automatically park at the target position is small, the automatic driving control unit 56 makes an inquiry about necessity of executing the automatic parking to the user regardless of whether the target not included in the features of the registered target position is present.

Processing in and after step S25c and processing in and after step S27 are processing similar to the processing in and after step S25 and the processing in and after step S27 described in FIG. 9. Therefore, description of the processing in and after step S25c and the processing in and after step S27 will be omitted.

As described above, according to the second modification of the automatic parking control, even when the self-position of the vehicle 10 with respect to the target position is estimated, when the history information on the automatic parking control for the target position satisfies the predetermined condition, even when the target not included in the features of the registered target position is not present, the automatic driving control unit 56 issues the notification inquiring of the user of the vehicle 10 necessity of executing the automatic parking control. Accordingly, for a user who uses the automatic parking control for the first time and a user whose number of times of use is small, the automatic parking control is not seamlessly executed, and after the notification inquiring necessity of execution is issued, the automatic parking control may be executed based on an answer of the user. Therefore, it is possible to prevent a situation where the automatic parking control is executed seamlessly which may arouse insecurity in the user.

The embodiment of the present disclosure has been described above, but the present disclosure is not limited to the embodiment described above, and modifications, improvements, and the like may be made as appropriate.

For example, in the embodiment described above, a case where the vehicle 10 is automatically parked by the automatic steering of the automatic driving control unit 56 has been described, but the present disclosure is not limited thereto. For example, the present disclosure may be applied to support parking assistance for performing support when parking the vehicle 10 by an operation of the driver.

In the embodiment described above, the parking position of the vehicle 10, and the features of the parking position and surroundings have been described using the top view images (combined images) of the front camera 12Fr, the rear camera 12Rr, the left side camera 12L, and the right side camera 12R, but the present disclosure is not limited thereto. For example, description may be made using an image captured by any one of the front camera 12Fr, the rear camera 12Rr, the left side camera 12L, and the right side camera 12R.

In the embodiment described above, a case where the automatic driving control unit 56 displays the top view image 71 or the like on the touch panel 42 of the vehicle 10 has been described, but the present disclosure is not limited thereto. For example, the automatic driving control unit 56 may display the top view image 71 or the like on a display screen of an information terminal (for example, a smartphone) carried by the passenger of the vehicle 10 via the communication unit 24.

In the embodiment described above, a case where information such as the map including the features related to the target position is registered in the storage unit 54 of the vehicle 10 has been described, but the present disclosure is not limited thereto. For example, the information may be registered in a storage unit of another device such as a smartphone or a server communicably connected to the vehicle 10.

In the embodiment described above, an example in which the moving body is used as a vehicle (four-wheeled automobile) has been described, but the present disclosure is not limited thereto. For example, a vehicle such as a two-wheeled vehicle or a Segway may be used. Further, the idea of the present disclosure is not limited to the vehicle, and may also be applied to a robot, a ship, an aircraft, or the like that includes a drive source and that can be moved by power of the drive source.

The control method described in the embodiment described above may be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that is communicable with the control device, or may be provided in a server device that is communicable with the control device and the electronic device.

In the present specification, at least the following matters are described. Corresponding components and the like in the embodiment described above are shown in parentheses, but the present invention is not limited thereto.

(1) A control device including:
an external environment recognition unit (external environment recognition unit 55) configured to acquire recognition data of an external environment of a moving body (vehicle 10);
an automatic driving control unit (automatic driving control unit 56) configured to perform automatic driving control for moving the moving body to a target position;
a storage unit (storage unit 54) configured to store target position information on the target position; and
a target position detection unit (target position detection unit 57) configured to detect the target position based on the recognition data,
in which, in response to the target position being detected, the automatic driving control unit
executes first determination processing of determining whether a self-position of the moving body with respect to the target position is estimated based on comparison between the recognition data and the target position information,
executes, in a case where the self-position is estimated in the first determination processing, second determination processing of determining whether a target (target 82) not included in the target position information is present around the target position,
issues, in a case where it is determined in the second determination processing that the target is present, a notification inquiring of a user of the moving body necessity of executing the automatic driving control for the target position, and executes, in a case where it is determined in the second determination processing that the target is not present, the automatic driving control.

According to (1), even when the self-position of the moving body is estimated, when the target not included in the target position information is present around the target position, since an inquiry about the necessity of executing the automatic driving control is made to the user, safety of the automatic driving control may be improved. Further, even when the target not included in the target position information is present in the recognition data of the external environment, when an execution instruction of the automatic driving control is received from the user for the inquiry, the automatic driving control may be executed. Therefore, unlike a case in which the automatic parking is executed only by similarity of an image, it is possible to prevent a situation where the automatic driving control cannot be executed in a place where the target position information is stored. Therefore, opportunities capable of executing the automatic driving control may be increased, and usability may be improved. Further, when the target not included in the target position information is not present in the recognition data of the external environment, since the automatic driving control may be executed seamlessly (no inquiry is made to the user), it is possible to reduce a burden on the user.

(2) The control device according to (1),
in which the target position information is a feature of the target position.

According to (2), by comparing features of the target position, the target not included in the target position information may be detected.

(3) The control device according to (1) or (2),
in which, when it is determined in the second determination processing that the target is present, the automatic driving control unit executes the automatic driving control according to an answer from the user of the moving body after a notification inquiring necessity of executing the automatic driving control is issued.

According to (3), by executing the automatic driving control in response to an answer from the user, it is possible to prevent a situation where the automatic driving control in a place where the target position information is stored cannot be executed, and to improve usability.

(4) The control device according to any one of (1) to (3),
in which, when the self-position is not estimated in the first determination processing, the automatic driving control unit does not execute the automatic driving control.

According to (4), high safety of the automatic driving control may be maintained.

(5) The control device according to (4),
in which, when the self-position is not estimated in the first determination processing, the automatic driving control unit receives selection of a target position of the automatic driving control from the user of the moving body.

According to (5), since designation of the parking position may be received and registered as a new target position, usability may be improved.

(6) The control device according to any one of (1) to (5),
in which, in the second determination processing, the automatic driving control unit determines whether the target is present based on comparison between a line of sight detection result of the user and history information on a line of sight of the user.

According to (6), for example, when a current line of sight significantly deviates from a representative value (for example, an average value) of history of the line of sight of the user in the automatic parking of the vehicle at the same target position in the past, it may be determined that "there is the target". Therefore, it is possible to accurately determine presence or absence of the target according to characteristics (habits or the like) of the user.

(7) The control device according to (6),
in which, in the second determination processing, the automatic driving control unit extracts history information corresponding to the target position and a relative position of the moving body from the history information on the line of sight, and determines whether the target is present based on comparison between the line of sight detection result and the extracted history information.

According to (7), it is possible to narrow down the history of the line of sight of the user in the automatic parking of the vehicle at the same target position in the past to the history in which a relative position between the target position and the moving body is close to a current relative position, and to more accurately determine the presence or absence of the target.

(8) The control device according to any one of (1) to (7),
in which, when the self-position is estimated in the first determination processing, and when the history information on the automatic driving control for the target position satisfies a predetermined condition, even when the target is not present, the automatic driving control unit issues a notification inquiring necessity of executing the automatic driving control to the user of the moving body.

According to (8), for a user who uses the automatic driving control for the first time and a user whose number of times of use is small, the automatic driving control is not seamlessly executed, and after the notification inquiring the necessity of the execution is issued, the automatic driving control is executed based on an answer of the user. Therefore, it is possible to prevent a situation where discomfort may be given to the user due to the automatic driving control being executed seamlessly, and usability is improved.

(9) The control device according to any one of (1) to (8),
in which the target position is a parking position of the moving body, and
the automatic driving control is automatic parking control to the parking position.

According to (9), it is possible to improve usability by applying the automatic parking control to the parking position of the moving body.

(10) A control method performed by a control device including a processor, the control device being configured to acquire recognition data of an external environment of a moving body, perform automatic driving control for moving the moving body to a target position, store target position information on the target position, and detect the target position based on the recognition data, the control method including:

in response to the target position being detected,
executing, by the processor, first determination processing of determining whether a self-position of the moving body with respect to the target position is estimated based on comparison between the recognition data and the target position information, executing, by the processor, in a case where the self-position is estimated in the first determination processing, second determination processing of determining whether a target not included in the target position information is present around the target position, issuing, by the processor, in a case where it is determined in the second determination processing that the target is present, a notification inquiring of a user of the moving body necessity of executing the automatic driving control for the target position, and executing, by the processor, in a case where it is determined in the second determination processing that the target is not present, the automatic driving control.

According to (10), even when the self-position of the moving body is estimated, when the target not included in the target position information is present around the target position, since an inquiry about the necessity of executing the automatic driving control is made to the user, safety of the automatic driving control may be improved. Further, even when the target not included in the target position information is present in the recognition data of the external environment, when an execution instruction of the automatic driving control is received from the user for the inquiry, the automatic driving control may be executed. Therefore, it is possible to prevent a situation where the automatic driving control cannot be executed in a place where the target position information is stored. Therefore, opportunities capable of executing the automatic driving control may be increased, and usability may be improved. Further, when the target not included in the target position information is not present in the recognition data of the external environment, the automatic driving control may be seamlessly executed, and therefore it is possible to reduce a burden on the user.

(11) A non-transitory computer readable storage medium storing a control program of a control device configured to acquire recognition data of an external environment of a moving body, perform automatic driving control for moving the moving body to a target position, store target position information on the target position, and detect the target position based on the recognition data, the control program causing a processor of the control device to execute processing including:

in response to the target position being detected, executing first determination processing of determining whether a self-position of the moving body with respect to the target position is estimated based on comparison between the recognition data and the target position information, executing, in a case where the self-position is estimated in the first determination processing, second determination processing of determining whether a target not included in the target position information is present around the target position, issuing, in a case where it is determined in the second determination processing that the target is present, a notification inquiring of a user of the moving body necessity of executing the automatic driving control for the target position, and executing, in a case where it is determined in the second determination processing that the target is not present, the automatic driving control.

According to (11), even when the self-position of the moving body is estimated, when the target not included in the target position information is present around the target position, since an inquiry about the necessity of executing the automatic driving control is made to the user, safety of the automatic driving control may be improved. Further, even when the target not included in the target position information is present in the recognition data of the external environment, when an execution instruction of the automatic driving control is received from the user for the inquiry, the automatic driving control may be executed. Therefore, it is possible to prevent a situation where the automatic driving control cannot be executed in a place where the target position information is stored. Therefore, opportunities capable of executing the automatic driving control may be increased, and usability may be improved. Further, when the target not included in the target position information is not present in the recognition data of the external environment, the automatic driving control may be seamlessly executed, and therefore it is possible to reduce a burden on the user.

What is claimed is:

1. A control device comprising:
   an external environment recognition unit configured to acquire recognition data of an external environment of a moving body;
   an automatic driving control unit configured to perform automatic driving control for moving the moving body to a target position;
   a storage unit configured to store target position information on the target position; and
   a target position detection unit configured to detect the target position based on the recognition data,
   wherein, in response to the target position being detected, the automatic driving control unit
      executes first determination processing of determining whether a self-position of the moving body with respect to the target position is estimated based on comparison between the recognition data and the target position information,
      executes, in a case where the self-position is estimated in the first determination processing, second determination processing of determining whether a target not included in the target position information is present around the target position,
      issues, in a case where it is determined in the second determination processing that the target is present, a notification inquiring of a user of the moving body necessity of executing the automatic driving control for the target position, and
      executes, in a case where it is determined in the second determination processing that the target is not present, the automatic driving control.

2. The control device according to claim 1,
   wherein the target position information is a feature of the target position.

3. The control device according to claim 1,
   wherein, when it is determined in the second determination processing that the target is present, the automatic driving control unit executes the automatic driving control according to an answer from the user of the moving body after a notification inquiring necessity of executing the automatic driving control is issued.

4. The control device according to claim 1,
   wherein, when the self-position is not estimated in the first determination processing, the automatic driving control unit does not execute the automatic driving control.

5. The control device according to claim 4,
   wherein, when the self-position is not estimated in the first determination processing, the automatic driving control unit receives selection of a target position of the automatic driving control from the user of the moving body.

6. The control device according to claim 1,
wherein, in the second determination processing, the automatic driving control unit determines whether the target is present based on comparison between a line of sight detection result of the user and history information on a line of sight of the user.

7. The control device according to claim 6,
wherein, in the second determination processing, the automatic driving control unit extracts history information corresponding to the target position and a relative position of the moving body from the history information on the line of sight, and determines whether the target is present based on comparison between the line of sight detection result and the extracted history information.

8. The control device according to claim 1,
wherein, when the self-position is estimated in the first determination processing, and when the history information on the automatic driving control for the target position satisfies a predetermined condition, even when the target is not present, the automatic driving control unit issues a notification inquiring necessity of executing the automatic driving control to the user of the moving body.

9. The control device according to claim 1,
wherein the target position is a parking position of the moving body, and
the automatic driving control is automatic parking control to the parking position.

10. The control device according to claim 2,
wherein the target position is a parking position of the moving body, and
the automatic driving control is automatic parking control to the parking position.

11. The control device according to claim 3,
wherein the target position is a parking position of the moving body, and
the automatic driving control is automatic parking control to the parking position.

12. The control device according to claim 4,
wherein the target position is a parking position of the moving body, and
the automatic driving control is automatic parking control to the parking position.

13. The control device according to claim 5,
wherein the target position is a parking position of the moving body, and
the automatic driving control is automatic parking control to the parking position.

14. The control device according to claim 6,
wherein the target position is a parking position of the moving body, and
the automatic driving control is automatic parking control to the parking position.

15. The control device according to claim 7,
wherein the target position is a parking position of the moving body, and
the automatic driving control is automatic parking control to the parking position.

16. The control device according to claim 8,
wherein the target position is a parking position of the moving body, and
the automatic driving control is automatic parking control to the parking position.

17. A control method performed by a control device including a processor, the control device being configured to acquire recognition data of an external environment of a moving body, perform automatic driving control for moving the moving body to a target position, store target position information on the target position, and detect the target position based on the recognition data, the control method comprising:
in response to the target position being detected,
executing, by the processor, first determination processing of determining whether a self-position of the moving body with respect to the target position is estimated based on comparison between the recognition data and the target position information,
executing, by the processor, in a case where the self-position is estimated in the first determination processing, second determination processing of determining whether a target not included in the target position information is present around the target position,
issuing, by the processor, in a case where it is determined in the second determination processing that the target is present, a notification inquiring of a user of the moving body necessity of executing the automatic driving control for the target position, and
executing, by the processor, in a case where it is determined in the second determination processing that the target is not present, the automatic driving control.

18. A non-transitory computer readable storage medium storing a control program of a control device configured to acquire recognition data of an external environment of a moving body, perform automatic driving control for moving the moving body to a target position, store target position information on the target position, and detect the target position based on the recognition data,
the control program causing a processor of the control device to execute processing comprising:
in response to the target position being detected,
executing first determination processing of determining whether a self-position of the moving body with respect to the target position is estimated based on comparison between the recognition data and the target position information,
executing, in a case where the self-position is estimated in the first determination processing, second determination processing of determining whether a target not included in the target position information is present around the target position,
issuing, in a case where it is determined in the second determination processing that the target is present, a notification inquiring of a user of the moving body necessity of executing the automatic driving control for the target position, and
executing, in a case where it is determined in the second determination processing that the target is not present, the automatic driving control.

* * * * *